(12) United States Patent
Paetsch et al.

(10) Patent No.: US 8,605,737 B2
(45) Date of Patent: Dec. 10, 2013

(54) METHOD FOR USING VOICE MESSAGES IN TELECOMMUNICATIONS CONNECTIONS

(75) Inventors: Frank Paetsch, Berlin (DE); Ivo Gadow, Berlin (DE)

(73) Assignee: TELES AG Informationstechnologien, Berlin (DE)

( * ) Notice: Subject to any disclaimer, the term of this patent is extended or adjusted under 35 U.S.C. 154(b) by 458 days.

(21) Appl. No.: 12/864,657

(22) PCT Filed: Jun. 24, 2009

(86) PCT No.: PCT/EP2009/057867
§ 371 (c)(1),
(2), (4) Date: Sep. 14, 2010

(87) PCT Pub. No.: WO2010/009949
PCT Pub. Date: Jan. 28, 2010

(65) Prior Publication Data
US 2011/0051739 A1    Mar. 3, 2011

(30) Foreign Application Priority Data
Jul. 24, 2008  (DE) .......................... 10 2008 035 033

(51) Int. Cl.
*H04L 12/56* (2011.01)
*H04L 12/58* (2006.01)

(52) U.S. Cl.
USPC ........................................ 370/401; 455/412.1

(58) Field of Classification Search
USPC ....................... 370/401, 410, 466; 379/88.17; 455/412.1
See application file for complete search history.

(56) References Cited

U.S. PATENT DOCUMENTS

| | | | |
|---|---|---|---|
| 6,233,234 B1 | 5/2001 | Curry et al. | |
| 8,054,951 B1 * | 11/2011 | Winslow et al. | 379/88.18 |
| 2003/0021394 A1 | 1/2003 | Krack | |
| 2003/0119478 A1 * | 6/2003 | Nagy et al. | 455/408 |
| 2003/0174155 A1 | 9/2003 | Weng et al. | |
| 2004/0152493 A1 * | 8/2004 | Phillips et al. | 455/567 |

(Continued)

FOREIGN PATENT DOCUMENTS

| | | |
|---|---|---|
| DE | 102 37 093 A1 | 2/2003 |
| DE | 102 60 401 A1 | 7/2004 |

(Continued)

*Primary Examiner* — Dang Ton
*Assistant Examiner* — Ryan Kavleski
(74) *Attorney, Agent, or Firm* — Novak Druce Connolly Bove + Quigg LLP; Vincent M DeLuca

(57) ABSTRACT

The invention relates to a method for using voice messages in telecommunications connections. The method comprises the following steps: —routing a connection establishment or the data of a through-connected telecommunications connection from a calling end system (11, 12) over at least one first communication network (31, 32) to a gateway (40), which represents an interface between the first communication network (31, 32) and a second communication network (51, 52), —routing the connection establishment or the data of the through-connected telecommunications connection from the gateway (40) over at least the second communication network (51, 52) to a called end system (21-24), —recording a standardized voice message concerning the telecommunications connection, which is provided to be transmitted to the calling end system (1, 11, 12), in the gateway (4, 40), —evaluating the standardized voice message, and —taking an action concerning the telecommunications connection or the gateway (40) through the gateway (40) depending on the result of the evaluation performed. The invention further relates to a gateway for performing such a method.

31 Claims, 2 Drawing Sheets

(56) References Cited

U.S. PATENT DOCUMENTS

Figure 1:
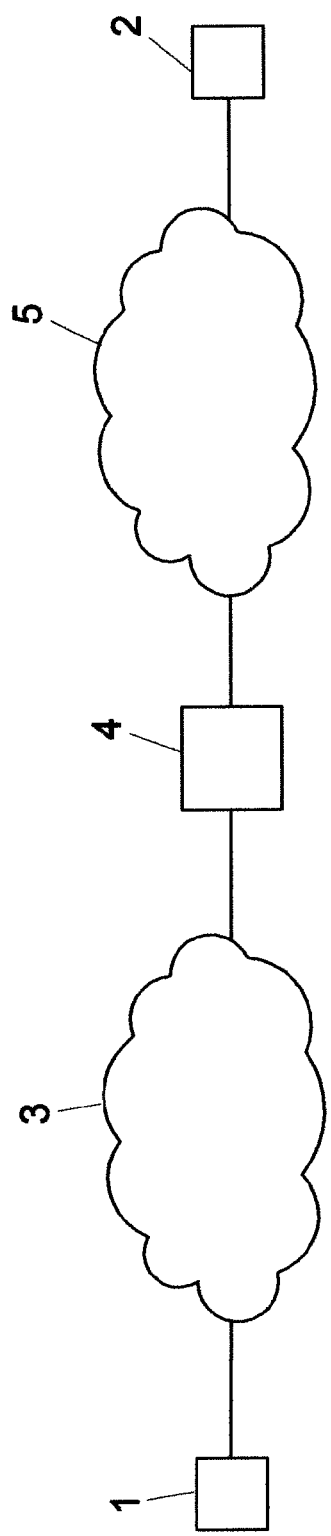

2006/0040642 A1* 2/2006 Boris et al. .................. 455/407
2007/0179778 A1 8/2007 Gong et al.
2010/0027766 A1* 2/2010 Shin ............................... 379/85

FOREIGN PATENT DOCUMENTS

| DE | 103 14 144 A1 | 10/2004 |
| DE | 103 41 737 A1 | 4/2005 |
| EP | 1 432 257 A1 | 6/2004 |

* cited by examiner

METHOD FOR USING VOICE MESSAGES IN TELECOMMUNICATIONS CONNECTIONS

This invention relates to a method for using voice messages in telecommunications connections and a gateway for performing such method.

BACKGROUND OF THE INVENTION

Gateways serve as interface between different types of networks and provide a network transition. One example for a gateway is a VoIP gateway which provides a network transition between an IP-based, packet-oriented communication network, for example the Internet or an NGN (Next Generation Network), and a circuit-switched communication network, for example a fixed telecommunications network such as the ISDN.

Another example for a gateway is a so-called mobile radio gateway, which provides an interface between one or more mobile radio telecommunications networks and any other networks, for example a fixed telecommunications network or an IP network. A mobile radio gateway is called by the user of another network and via a mobile radio channel routes the desired connection into the mobile radio network in which the called subscriber is located. For this purpose, the mobile radio gateway implements the functionality of a mobile radio telephone and calls the called subscriber as a mobile radio telephone, so to speak. Mobile radio gateways thus have the same mobile radio modules as they are used in mobile radio terminals (Handys). Such mobile radio gateways are known for example from DE 103 14 144 A1.

It is known that the mobile radio gateway contains a multitude of plug-in cards, in particular so-called SIM cards for the mobile radio channels managed. Any kind of SIM-Karten of various network operators can be used. A SIM card is a plug-in card with an identifier by means of which a mobile radio device is assigned to a specific network operator, receives a particular telephone number and can unambiguously be identified in all mobile radio networks. In addition, a SIM card has a PIN number (PIN—Personal Identity Number), safety-relevant data such as communication keys and safety algorithms, user-specific data such as speed-dial numbers and network-specific data such as the identifier of the current location area. A SIM card personalizes a mobile radio terminal with regard to the user and with regard to the network operator and provides for the accounting of call charges of the network operator.

It is furthermore known that for the case that problems arise when establishing a communication connection, for example because the called end subscriber does not exist, the network is overloaded or a monetary credit volume of the calling subscriber is used up, a communication network generates a standardized voice message which is transmitted to the calling subscriber of a desired communication connection for information purposes. Examples for such standardized voice message include "subscriber not reachable", "telephone number has changed" or "no more credit available". In general, such standardized voice message is generated by a computer system or has been recorded in advance.

It is the object underlying the present invention to provide a method for using voice messages in telecommunications connections. Furthermore, a gateway should be provided for performing such method.

SUMMARY OF THE INVENTION

In accordance with the invention, this object is solved by a method with the features of claim 1 and by a gateway with the features of claim 23. Exemplary aspects of the invention are indicated in the sub-claims.

Accordingly, the method of the invention provides that in a gateway which provides an interface between two communication networks voice messages standardized in connection with a connection establishment or a data transmission are recorded and evaluated in the gateway. The evaluation is made for example with regard to the pause-sound information. In dependence on the evaluation made the gateway takes an action concerning the telecommunications connection observed or the gateway in general.

Thus, the gateway can recognize different voice messages and will take a particular action in dependence on the respective voice message. Examples for such action include generating a signalization and/or activating or deactivating a telecommunications hardware and/or software. The solution in accordance with the invention provides for detecting problems or errors concerning the telecommunications connection to be built up or connected through early on and already initiate counter-measures in the gateway which are conducive to the desired connection establishment or the desired data transmission.

A standardized voice message in the sense of the present invention is a voice message which is characterized by defined values as regards word count, word length and spacing between the individual words. Non-standardized voice information, such as that of a telephone conversation between natural persons, is no voice message in the sense of this description. A voice message of the type observed in this invention usually is provided to be transmitted to the calling end system.

In one aspect of the invention, the evaluation of a voice message is made with regard to its pause-sound information, with a pattern recognition being effected in the sense that the length of the individual words and/or the length of the pauses between the individual words and/or the number of the individual words of the voice message are recorded. In principle, however, a more sophisticated voice recognition can be performed, which then however requires both much more processor performance and training frequencies.

Pause-sound information in the sense of the present invention in particular is information on the number of words of a voice message, the length of the individual words of the voice message and the length of the pauses between the respective words. The pause-sound information provides a pattern which is recognized by the gateway during the voice message analysis. This pattern can be compared with previously defined patterns, which for example a user has configured in advance or which are stored. To each of these patterns a specific action is assigned. After recording the pause-sound information of a voice message and recognizing the pattern of this voice message, the pattern recognized is compared with the previously configured or stored patterns and then that action is performed which is assigned to the pattern corresponding with the current pattern.

In one aspect, the recording of a voice message comprises an examination as to whether or not the voice data transmitted are a voice message at all. This examination can be made implicitly. For example, when a pattern can be assigned to the voice message recorded, which pattern corresponds with a previously configured or stored pattern, it can be determined that this also is a voice message. It is also possible to evaluate additional information in this respect. For example, it can be provided that the transmission of a voice message is accompanied by a specific signalization (inner band or outer band signalization) which is recognized by the gateway.

In one aspect, the action taken by the gateway relates to a changed routing of the connection establishment or of the data of the telecommunications connection. For example, signaling data are sent out for building up an alternative analog channel or ISDN channel. In another aspect, the action taken by the gateway relates to the activation or deactivation of telecommunications hardware and/or software which is used for connection establishment and/or for data transmission to the called end system. An example of this is the blocking of a plug-in card (e.g. SIM card) and/or the switching to a different plug-in card and/or the reloading of a plug-in card in a mobile radio gateway.

A voice message can be generated in various ways and can contain all kinds of information. Examples for the information obtained include information on the called end system, information on the second communication network or information on credits and/or costs. Generating a voice message can for example be effected by the second communication network (or a further communication network coupled with the same) or by the called end system.

In a further aspect it is provided that the mobile radio gateway blocks a routing of the recorded voice message to the calling end system. This can be expedient when the cause that has led to the generation of the voice message is already eliminated by the action taken by the gateway. It can be provided that the voice message first is temporarily stored in the gateway and only is forwarded after an internal controller has decided that this should be done.

In a further embodiment, the gateway furthermore evaluates signaling information which it has recorded in connection with an outer band signalization or an inner band signalization. This signaling information relates to the voice message. It can be provided that information of an outer band signalization or inner band signalization is used for detecting a voice message, i.e. for detecting whether a voice message is present at all. Furthermore, it can be provided that information of an outer band signalization or inner band signalization is used for evaluating a voice message, i.e. for assigning the voice message to an action. The pattern recorded is evaluated further together with the signaling information.

In one embodiment, the gateway is a VoIP gateway and the first communication network is an IP network. The VoIP gateway is used for example for VoIP telephony via the Internet and provides an interface between the Internet and a fixed telecommunications network or mobile radio network.

In another variant, the gateway is a mobile radio gateway and the second communication network is a mobile radio network, wherein the mobile radio gateway includes a plurality of radio modules for mobile communication, and a plurality of plug-in cards provided with an identifier are assigned or assignable to the mobile radio gateway, which each provide for using a radio module for mobile communication. A voice message for example can relate to information on the status of a plug-in card contained in the mobile radio gateway or assigned to the same or information on the credit balance of a plug-in card.

A standardized voice message which is provided to be transmitted to the calling end system is generated for example by a telecommunication device or by a telecommunications network. A standardized voice message for example is automatically generated by a computer system of a telecommunications network with which the called end system is connected or by a telecommunication device of the called end system.

This invention also relates to a gateway which is suitable for performing the method according to claim 1. The same includes means for evaluating a standardized voice message which is provided to be transmitted to a calling end system, and means for taking an action concerning a telecommunications connection or the gateway in dependence on the evaluation made.

In one aspect, the means for evaluating a standardized voice message perform a pattern recognition in the sense that the length of the individual words and/or the length of the pauses between the individual words and/or the number of the individual words of the voice message are recorded. The means for evaluating a voice message and the means for taking an action for example constitute software modules which are part of a controller of the gateway.

DESCRIPTION OF EMBODIMENTS OF THE INVENTION

Figure 2:
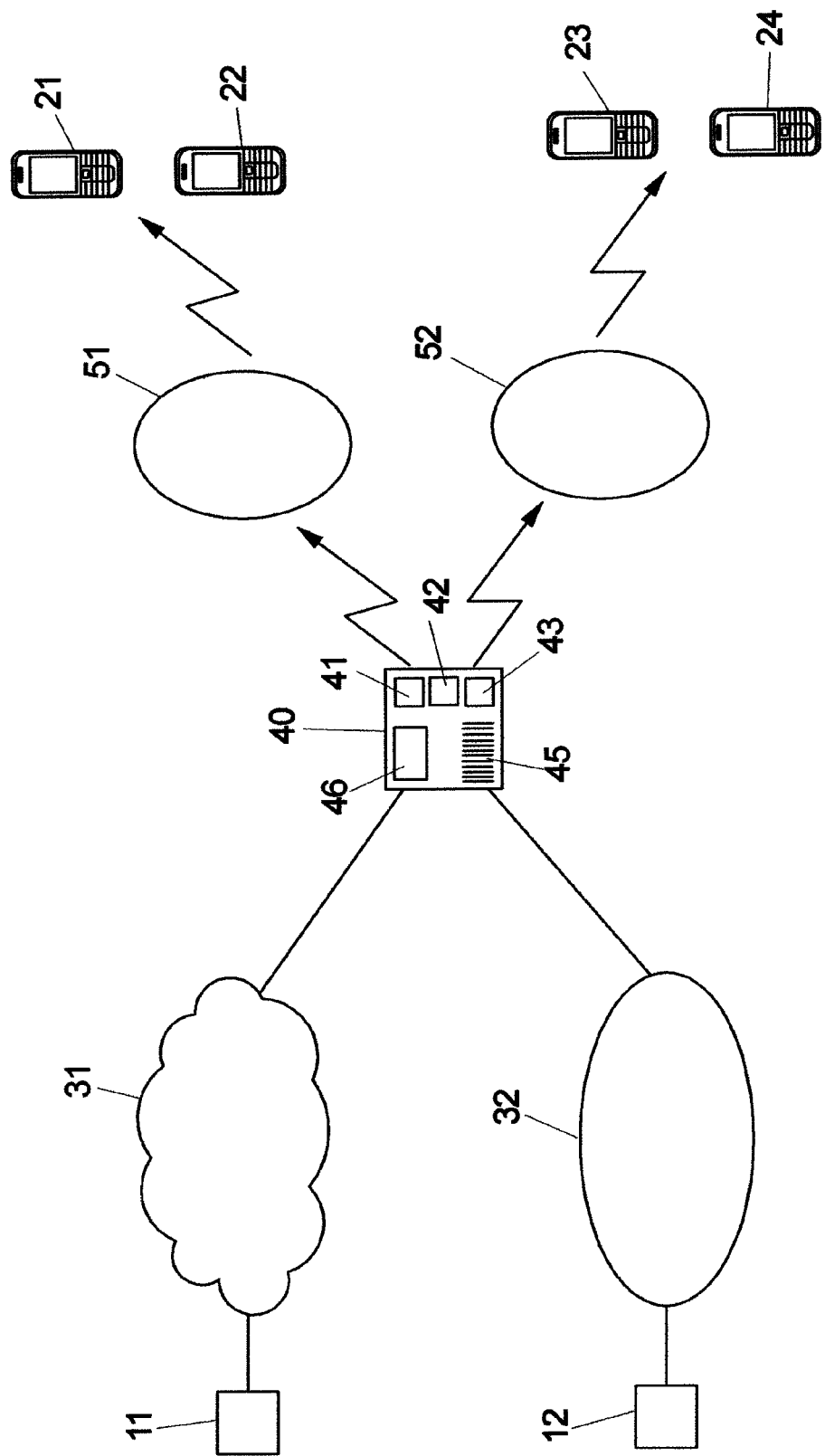

The invention will be explained in detail below by means of several embodiments with reference to the Figures of the drawing, in which:

FIG. 1 schematically shows a first telecommunications arrangement with a gateway which is suitable for implementing the method of the invention; and FIG. 2 shows a second embodiment of a telecommunications arrangement which is suitable for implementing the method of the invention, wherein the gateway is configured as a mobile radio gateway.

FIG. 1 shows a telecommunications arrangement which provides for establishing and maintaining a telecommunications connection between a calling end system 1 and a called end system 2. The calling end system 1 for example is a telecommunications terminal, e.g. a landline telephone, an IP telephone, a mobile radio telephone, a computer with a telephony software, a hand-held, a WLAN-enabled terminal, etc. However, the end system 1 can also be a local network or a telecommunications system (PBX), to which a multitude of telecommunications terminals are connected. The same applies to the called end system 2. In the following, it is assumed by way of example that both the calling end system and the called end system each are telecommunications terminals.

The calling terminal 1 is connected with a gateway 4 via at least one first communication network 3. The gateway 4 provides an interface between the first communication network 3 and a second communication network 5 to which the called terminal 2 is connected.

In principle, the first and second communication networks 3, 5 each can be any kind of communication network. Examples include a circuit-switched network, for example a fixed telecommunications network such as the ISDN (Integrated Services Digital Network) or PSTN (Public Switched Telephone Network), a mobile radio network, a WLAN or a packet-switched network like for example an IP network such as the Internet or an NGN. It should also be noted that the connection between the calling terminal 1 and the gateway 4 on the one hand and between the gateway 4 and the called terminal 2 on the other hand can be effected via more than one network, which are coupled to each other, for example by using further gateways or by means of interconnect connections. To simplify matters, FIG. 1 each shows only one communication network 3, 5 between the calling terminal 1 and the gateway 4 as well as between the gateway 4 and the called terminal 2.

It now is conceivable that during the connection establishment or during a through-connected call a problem occurs with respect to the connection establishment or the data transmission of the through-connected connection. For example, a terminal exists for the called telephone number. Another example for an occurring problem is an overload of the second telecommunications network 5. There can also occur the problem that the calling subscriber wants to pay the costs of the telecommunications connection by a so-called prepaid card which shows a monetary balance, but the credit is already used up or lies below the amount required for the desired communication connection. In such cases it is known in principle that a standardized voice message is generated. Such standardized voice message can be effected for example by the called terminal 2 or the communication network 5, which terminates the telecommunications connection to the called terminal, or a network which is connected with such terminating communication network 5. Examples for such standardized voice messages include "subscriber not reachable", "telephone number has changed" or "no more credit available".

Such standardized voice message—subsequently referred to as voice message—is sent by its generator to the gateway 4, so that the gateway 4 can forward the same to the calling terminal 1 or its user for information thereof.

The present invention now is based thereon. For this purpose, the standardized voice message, subsequently referred to as voice message, initially is detected and recorded in the gateway 4. For this purpose, the gateway includes means for evaluating a voice message, which analyse the voice message as regards the pause-sound information. Such means are provided for example by a software module. To analyse the pause-sound information, the corresponding module of the gateway performs a pattern recognition in the sense that the length of the individual words of the voice message, the length of the pause between the individual words of the voice message and/or the number of the individual words of the voice message are recorded. It should be noted that standardized voice messages each are characterized by an exact identity as regards word count, word length and the pause between the individual words. Via said pattern recognition, an identification of the voice message can therefore be effected.

After performing a pattern recognition, the means for evaluating the voice message furthermore compare the known pattern with previously stored or configured patterns, wherein at least one action to be performed is assigned to each preconfigured pattern. Thus, a specific action is defined via the pattern recognition.

After this analysis, the gateway 4 performs the action assigned to the recognized pattern. A wide variety of actions can be taken. In one embodiment, a signalization is generated which provides for an alternative routing of the call setup or the through-connected connection to the called terminal 2. In another embodiment, the gateway 4 activates or deactivates telecommunications hardware and/or software which is used for connection establishment or for data transmission to the called terminal 2.

In dependence on the voice message and the problem implied by the voice message, the gateway 4 can take measures to solve the problem and thereby ensure a safe connection establishment or the maintenance of a through-connected connection.

It should be noted that the means for evaluating the voice message need not necessarily be arranged in the gateway itself. These means can also be implemented in a device with which the gateway communicates. However, the voice message must first be recorded in the gateway.

In an exemplary embodiment, the communication network 3 is an IP network, for example the Internet, and the communication network 5 is a circuit switching network, for example the fixed network. The gateway 4 constitutes a VoIP gateway. A telephone call first is transmitted to the gateway 4 via the packet switching network 3, with no costs being incurred for the data transmission. The communication connection only will incur costs when the circuit-switched network 5 is involved for data transmission. Typically, a gateway 4 which geographically is located as close as possible to the terminal 2 will be selected for an observed telecommunications connection, so that the involvement of the circuit-switched network 5 for call setup and for data transmission is minimized.

If a voice message now is made, for example to the effect that a called connection is not reachable or has been switched off, an available credit is used up or a network is overloaded, the corresponding voice message is recorded at the gateway 4, evaluated by a pattern recognition, and then an action assigned to the detected pattern is performed. The action for example concerns the routing of the data back through the packet-switched network 3 to another gateway, the activation of another analog or digital channel in the circuit switching network 5, the generation of an alarm, the blocking of the gateway 4 for another data transmission, etc.

It can be provided that the gateway 4 does not forward the voice message obtained to the calling terminal 1. This is expedient in particular when the problem indicated by the voice message is eliminated by the corresponding action of the gateway 4, so that it is actually not necessary to forward the voice message to the calling terminal 1. The voice message first can temporarily be stored in the gateway, until it is clear whether or not the problem can be eliminated.

FIG. 2 shows an embodiment of a telecommunications infrastructure with a gateway 40 which constitutes a mobile radio gateway.

Via the mobile radio gateway 40 a connection can be made between a calling end system 11, 12 and a called end system 21 to 24, which is a mobile radio terminal. For example, a call coming from a first telecommunications terminal 11 is routed to the gateway 40 via a packet switching network 31. A call coming from a second telecommunications terminal 12 for example is routed to the gateway 40 via a circuit switching network 32. The mobile radio gateway 40 provides a network transition to at least one mobile radio network, in the illustrated example to two mobile radio networks 51, 52. In Germany, for example, these are the networks T-Mobil, Vodafone, E-PLUS or $O_2$.

Via the mobile radio gateway 40, a mobile radio channel and hence a call to a called mobile radio terminal 21, 24 thus can each be provided. In the mobile radio gateway a multitude of mobile stations are integrated, which each comprise a radio module and a SIM card. A plurality of SIM cards 45 and radio modules 41, 42, 43 are shown in FIG. 2 schematically and by way of example as parts of the gateway 40. The SIM cards 45 each can firmly be assigned to a radio module 41, 42, 43. It can likewise be provided that the SIM cards 45 form a pool from which a SIM card each is assigned to a radio module for a concrete mobile radio connection.

The SIM cards 45 either can physically be present themselves in the mobile radio gateway 40 or alternatively be merely emulated there. In the latter case, the physical SIM cards are arranged in a central SIM server (not shown). Depending on the individual specifications and needs, a SIM card is requested on the part of a mobile radio gateway from the SIM server and provided by the same to the mobile radio gateway. Providing a SIM card is not effected physically. The information which identifies a SIM card and reflects its functionality is transmitted to the mobile radio gateway via remote data transmission.

Of course, the SIM cards 45 can, however, also be contained in the gateway 40 itself. For the following description it is not important where the SIM cards 45 are arranged physically.

An incoming call which reaches the mobile radio gateway 40 via the communication network 31 or the communication network 32 is assigned to one of the radio modules 41 to 43 and a SIM card 45 via a controller 46 which can be arranged in the gateway 40 itself or in an external device. A mobile station is selected or provided by providing a suitable SIM card, in which the SIM card is assigned to the mobile radio network operator to which the called terminal 21-24 also is assigned. Via the SIM card 45, the mobile radio channel to be used is defined. The selected radio module 41-43 with the assigned SIM card now realizes a mobile radio channel to the called mobile radio terminal, for example to the mobile radio terminal 21. The activated radio module calls the mobile radio terminal 21 by using the assigned SIM card. Via a transmitting/receiving station BTS (BTS=Base Transceiver Station), an associated control means and further network infrastructure of the involved mobile radio network 51, the call is transmitted to the mobile radio terminal 21.

Thus, a mobile radio channel is provided by using a SIM card 45 and—upon completion of the call setup to the called mobile radio terminal 21 and through-connection of the call—is used for the telecommunications connection to the mobile radio terminal 21. The mobile radio gateway 40 calls the mobile radio terminal 21 as a mobile radio telephone, so to speak.

The structure of a mobile radio gateway is described by way of example in EP 1 432 257 A1.

As an example for a possible problem which is communicated to the mobile radio gateway 40 by means of a standardized voice message, the situation now is observed where no more credit is available on the SIM card 45 of the mobile radio gateway 40 used for the current call (for example, this is a prepaid SIM card with a given credit), or the SIM card is blocked by the mobile radio operator of the corresponding mobile radio network for any reason. During call setup from the gateway 40 to the terminal 21, this fact is communicated to the calling terminal and hence to the mobile radio gateway 40 by means of a voice message which is initiated by the involved mobile radio network 51. The same possesses all information on the validity and activation of all SIM cards of the network.

The mobile radio gateway 40 detects such voice message by means of a corresponding evaluation module, which can be part of the controller 46. For example, the corresponding mobile radio channel is monitored. It is known to perform a so-called voice activity detection for outgoing calls. It can also be provided that signaling information is evaluated, which possibly accompanies the voice message.

If a voice message is detected by the mobile radio gateway 40, the mobile radio gateway 40 performs a pattern recognition and analyses the voice message with regard to its characteristic properties, in particular with regard to the length of the pauses and words and/or the number of spoken words.

For example, the message "subscriber not reachable" contains the pattern: 200 ms sound-20 ms pause-80 ms sound-20 ms pause-300 ms sound and/or 3 words. The voice message "your credit is used up" corresponds to the pattern: 50 ms sound-20 ms pause-300 ms sound-20 ms pause-50 ms sound-20 ms pause-300 ms sound and/or 4 words.

By means of a given pattern table, which is updated for example by a network management and/or can be configured by a user, a specific action is assigned to the recognized pattern. A possible action consists in that the call is directed to another channel and is realized in connection with another SIM card (change of channel). It can also be provided that the blocked SIM card is replaced by a non-blocked SIM card in the mobile radio gateway 40. Since the occurred problem is solved, it is expedient to block the voice message in the mobile radio gateway 40 and not pass it through to the calling subscriber 11, 12. It can, however, also be provided to nevertheless pass the voice message through.

Another example for an action to be performed by the mobile radio gateway 40 in the case observed is the provision of a credit for the corresponding SIM card, i.e. the blocked card is reloaded and then is available again.

The corresponding action is performed for example by a module which is part of the controller 46.

The mobile radio gateway 40 can of course also perform other measures in dependence on the voice message which is recorded and analysed by the gateway 40. For the case that the voice message reads: "Subscriber not reachable", a so-called cause-message can be generated by the gateway 40 for the circuit-switched network 32. In EURO-ISDN, such messages are defined as typical error messages. Both the source of the error message and the cause of the message are indicated. On the basis of a voice message, the gateway 40 thus performs a translation of an error message of the mobile radio network 51 into a corresponding error message for example of a circuit switching network such as the ISDN.

The invention provides for making a connection establishment and for maintaining a through-connected connection in the case of occurring errors which are identified by means of standardized voice messages. Due to the evaluation of the voice message by a kind of pattern recognition, the necessity of a high processor performance and of training sequences, as they are required in voice recognition systems, is avoided. At the same time, the gateway is able to flexibly react to occurring errors and initiate the required actions, in order to eliminate the error that has occurred on its own and ensure a successful connection establishment or a maintenance of the through-connected connection.

The invention is not limited in its configuration to the embodiments described above. For example, instead of a VoIP gateway or a mobile radio gateway any other gateways can be used in connection with the invention. Furthermore, for example the voice messages mentioned and the actions performed by the gateway in reaction thereto should merely be understood as examples.

The invention claimed is:

1. A method for using voice messages in telecommunications connections, comprising:
    establishing at a gateway, which represents an interface between a first communication network and a second communication network, a connection establishment or data of a through-connected telecommunications connection routed from a calling end system via said first communication network,
    routing the connection establishment or data of the through-connected telecommunications connection from the gateway via at least the second communication network to a called end system,
    detecting in the gateway a standardized voice message concerning the telecommunications connection, which is provided to be transmitted to the calling end system, wherein the standardized voice message comprises defined values with respect to at least one of word count, word length, and spacing between individual words, and
    taking an action by the gateway concerning the telecommunications connection or the gateway in response to an evaluation of the standardized voice message detected in the gateway, wherein
        the evaluation of the standardized voice message is made with regard to its pause-sound information, with a pattern recognition being effected in that the length of the individual words and/or the length of the pauses between the individual words and/or the number of the individual words of the standardized voice message are detected.

2. The method according to claim 1, wherein the recognized pattern is compared with previously stored or configured patterns, wherein at least one action to be performed is assigned to each stored or preconfigured pattern and the gateway performs the corresponding action in dependence on the recognized pattern.

3. The method according to claim 1, wherein the evaluation of the voice message comprises the evaluation of the information transmitted on a voice channel of the telecommunications connection.

4. The method according to claim 1, wherein the evaluation of the standardized voice message comprises an examination as to whether the data of the through-connected telecommunications connection transmitted is a voice message.

5. The method according to claim 1, wherein the action taken by the gateway relates to a changed routing of the connection establishment or the data of the telecommunications connection.

6. The method according to claim 1, wherein the action taken by the gateway comprises the sending out of signaling information for connection establishment.

7. The method according to claim 1, wherein the action taken by the gateway relates to the activation or deactivation of telecommunications hardware and/or software which is used for connection establishment and/or for data transmission to the called end system.

8. The method according to claim 1, wherein the standardized voice message comprises information on the called end system.

9. The method according to claim 1, wherein the standardized voice message relates to information on the second communication network.

10. The method according to claim 1, wherein the voice message comprises credit information and/or cost information.

11. The method according to claim 1, wherein the standardized voice message is generated by the second communication network or a further communication network coupled to the same.

12. The method according to claim 1, wherein the standardized voice message is generated by the called end system.

13. The method according to claim 1, wherein the gateway blocks routing of the standardized voice message to the calling end system.

14. The method according to claim 1, wherein the evaluation of the standardized voice message comprises the evaluation of information of an outer band signalization or an inner band signalization.

15. The method according to claim 1, wherein the gateway is a VoIP gateway and the first communication network is an IP network.

16. The method according to claim 1, wherein the gateway is a mobile radio gateway and the second communication network is a mobile radio network, wherein the mobile radio gateway includes a plurality of radio modules for mobile communication, and a plurality of plug-in cards provided with an identifier are assigned or assignable to the mobile radio gateway, which each provide for using a radio module for mobile communication.

17. The method according to claim 16, wherein the standardized voice message comprises information on the status of a plug-in card contained in the mobile radio gateway or assigned to the same.

18. The method according to claim 17, wherein the standardized voice message relates to information on a credit balance of the plug-in card and/or a blocking or activation of the plug-in card by the mobile radio network operator.

19. The method according to claim 16, wherein the action taken by the gateway relates to the blocking of a plug-in card and/or the changing of a plug-in card and/or the reloading of a plug-in card.

20. The method according to claim 16, wherein the plug-in cards constitute SIM cards.

21. The method according to claim 1, wherein the standardized voice message is generated by a telecommunication device and/or by a telecommunications network.

22. A gateway comprising:
an interface connected to a first communication network and another interface connected to a second communication network, with respect to an established connection or data of a through-connected telecommunications connection routed from a calling end system via said first communication network, to a called end system via said second communication network;
a first module configured to evaluates a standardized voice message which is provided to be transmitted to the calling end system, wherein the standardized voice message comprises defined values with respect to at least one of word count, word length, and spacing between individual words, wherein evaluating the standardized voice message is made with regards to its pause-sound information, with a pattern recognition being affected by the length of the individual words and/or the length of the pauses between the individual words and/or the number of the individual words of the standardized voice message detected; and
a second module configured to takes an action concerning the telecommunications connection or the gateway in response to the evaluation performed on the standardized voice message.

23. The gateway according to claim 22, wherein the first module evaluates the standardized voice message by comparing the recognized pattern with previously stored or configured patterns, wherein at least one action to be performed is assigned to each stored or preconfigured pattern and the action performs the corresponding action in dependence on the recognized pattern.

24. The gateway according to claim 22, wherein the first module evaluates the standardized voice message by evaluating the information transmitted on a voice channel of the telecommunications connection.

25. The gateway according to claim 22, wherein the action comprises changing the routing of the connection establishment or the data of the telecommunications connection.

26. The gateway according to claim 22, wherein the action comprises sending out signaling information for connection establishment.

27. The gateway according to claim 22, wherein the action comprises activating and/or deactivating telecommunications hardware and/or software which is used for connection establishment and/or for data transmission to the called end system.

28. The gateway according to claim 22, wherein the gateway blocks routing of the standardized voice message to the calling end system.

29. The gateway according to claim 22, wherein the gateway is a mobile radio gateway to which a plurality of plug-in cards are assigned for mobile communication.

30. The gateway according to claim 29, wherein the gateway blocks and/or changing and/or reloading a plug-in card.

31. A communication arrangement, comprising a first communication network, a second communication network, and a gateway according to claim 22.

\* \* \* \* \*